(12) United States Patent
McClanahan

(10) Patent No.: US 6,260,668 B1
(45) Date of Patent: Jul. 17, 2001

(54) BRAKE SYSTEM FOR ELECTRICALLY POWERED VEHICLES

(75) Inventor: William V. McClanahan, Beckley, WV (US)

(73) Assignee: Highland Machinery Corporation, Oak Hill, WV (US)

( * ) Notice: Subject to any disclaimer, the term of this patent is extended or adjusted under 35 U.S.C. 154(b) by 0 days.

(21) Appl. No.: 09/305,800

(22) Filed: Apr. 29, 1999

(51) Int. Cl.⁷ .................................................. F16D 35/36
(52) U.S. Cl. ....................... 188/71.5; 188/71.6; 74/421 A
(58) Field of Search ................. 188/71.5, 71.6, 188/170; 74/421 A; 192/221, 225

(56) References Cited

U.S. PATENT DOCUMENTS

| | | |
|---|---|---|
| 654,620 | 7/1900 | Garver . |
| 1,754,286 | 4/1930 | Shields . |
| 3,361,949 | 1/1968 | Mazalov et al. ................ 192/4 B |
| 3,684,067 | 8/1972 | Anderson ........................ 192/4 R |
| 3,770,074 | 11/1973 | Sherman ......................... 180/65 F |
| 3,892,300 * | 7/1975 | Hapeman et al. .............. 74/421 A |
| 4,108,291 | 8/1978 | Zenker ............................ 192/4 R |
| 4,114,479 * | 9/1978 | Ashfield .......................... 192/218 |
| 4,179,016 | 12/1979 | Alderman et al. .............. 192/4 A |
| 4,187,936 | 2/1980 | Davenport ...................... 192/21 |
| 4,310,080 | 1/1982 | Jarvis et al. .................... 192/4 B |
| 4,340,320 | 7/1982 | Moss ............................... 404/122 |
| 4,491,202 * | 1/1985 | Schmitt ............................ 188/71.5 |
| 4,601,218 | 7/1986 | Bohle .............................. 74/785 |
| 4,635,491 * | 1/1987 | Yamano et al. ................. 74/89.15 |
| 4,820,209 | 4/1989 | Newman ......................... 440/74 |
| 4,843,910 | 7/1989 | Loeber et al. .................. 74/762 |
| 5,183,138 * | 2/1993 | Jolliff ............................... 74/371 |
| 5,226,508 * | 7/1993 | Ericson et al. .................. 188/71.5 |
| 5,325,939 | 7/1994 | Schwendt ........................ 188/33 |
| 5,586,630 * | 12/1996 | Orzal ............................... 192/221 |

OTHER PUBLICATIONS

Joy Manufacturing Co. Dwg. No. ET 003014–0004 dated Feb. 2, 1988.
Joy Manufacturing Co. Dwg. No. 500296–387 dated Aug. 21, 1985 and attached parts list.
Joy Manufacturing Co. Dwg. No. 533537–24 dated Jul. 18, 1985 and attached parts listed.

* cited by examiner

Primary Examiner—Robert J. Oberleitner
Assistant Examiner—Robert A. Siconolfi
(74) Attorney, Agent, or Firm—Connolly Bove Lodge & Hutz LLP

(57) ABSTRACT

A brake system for braking an output shaft rotated by a drive gear train driven by an electric motor capable of generating a maximum drive torque at the output shaft. The brake system includes a brake device capable of applying a maximum braking torque to a brake shaft, and a brake gear train having a brake gear fixed to the brake shaft and at least two rotatably mounted reduction gears for transmitting torque between the output shaft and the brake gear. The brake gear and the reduction gears provide a reduction gear ratio sufficient to reduce the maximum drive torque to a drive torque at the brake shaft substantially less than the maximum braking torque available from the brake device. The brake device may include a plurality of fixed discs and rotating discs enclosed in a housing and immersed in a cooling fluid.

15 Claims, 6 Drawing Sheets

BRAKE SYSTEM FOR ELECTRICALLY POWERED VEHICLES

TECHNICAL FIELD

This invention relates generally to brake systems for vehicles, and more specifically to an improved brake system for electrically driven vehicles, such as underground mining cars.

BACKGROUND OF THE INVENTION

Although the present invention is applicable to any electrically powered vehicle, it is especially useful on underground mining cars known as "scoop" cars. These cars scoop up and transport to a conveyor belt or to a larger capacity vehicle, such as a rail car or truck, fractured ore or coal that has been broken away from a fixed vein or deposit. Such cars are also used to transport equipment and supplies within an underground mine.

Conventional disc brakes when used on scoop cars, as may be seen in FIG. 6, are considered unreliable because they lack sufficient braking torque to stop or hold the car against a heavy load or against the power of the electric drive motor, which may be operated inadvertently by the operator. As often happens, operators forget to release the brake so that the car may be operated for some time with the brake engaged before burning up of the brake brings this problem to the operator's attention. Such occurrences result in rapid destruction of the brake and inoperable braking systems, which in turn cause federal mine safety violations.

SUMMARY OF THE INVENTION

The present invention overcomes the problems of the prior art by providing a brake system with much greater braking power and durability than prior art systems. In this regard, the preferred embodiment provides sufficient braking torque to prevent movement of the car unless the brake is disengaged, even upon application of full power, and to stop the car even at maximum torque generated by the electric drive motor. The level of braking power provided by the invention translates into a new brake system with greater durability and much longer service life than conventional brake systems.

The invention achieves these advantages, at least in part, by interconnecting a brake assembly to the drive shaft of the vehicle through a brake reduction gear train using reverse gear ratios that directly oppose the forward gear ratios of the drive reduction gear train connecting the electric motor to the drive shaft of the vehicle. In other words, the reverse ratio of the brake gearing opposes the forward ratio of the drive gearing to create sufficient braking torque at the brake head to prevent the electric motor from overpowering the holding power of the brake assembly.

BRIEF DESCRIPTION OF THE DRAWINGS

The invention, both as to its structure and operation, may be further understood by reference to the detailed description below taken in conjunction with the accompanying drawings, in which.

DETAILED DESCRIPTION OF THE PREFERRED EMBODIMENTS

Figure 1:
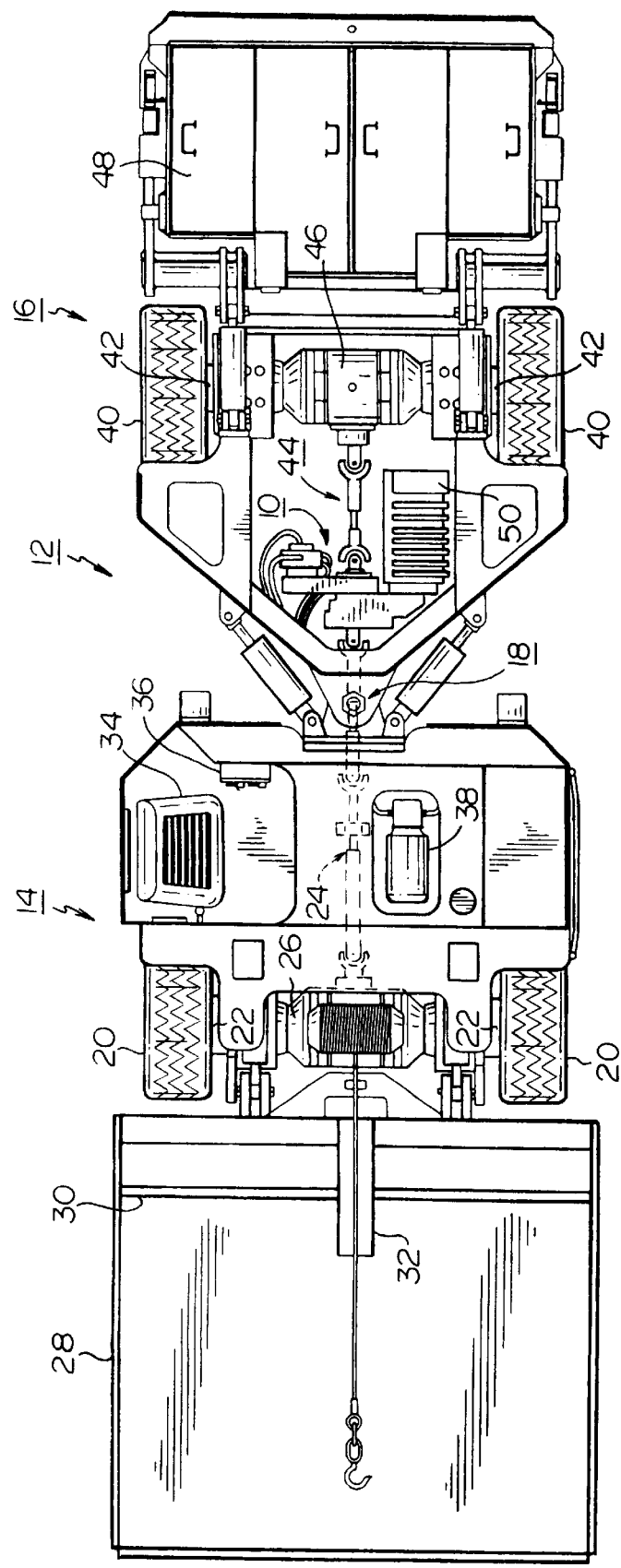
FIG. 1 is a top overall plan view of a scoop car employing the brake system of the invention.
Figure 2:
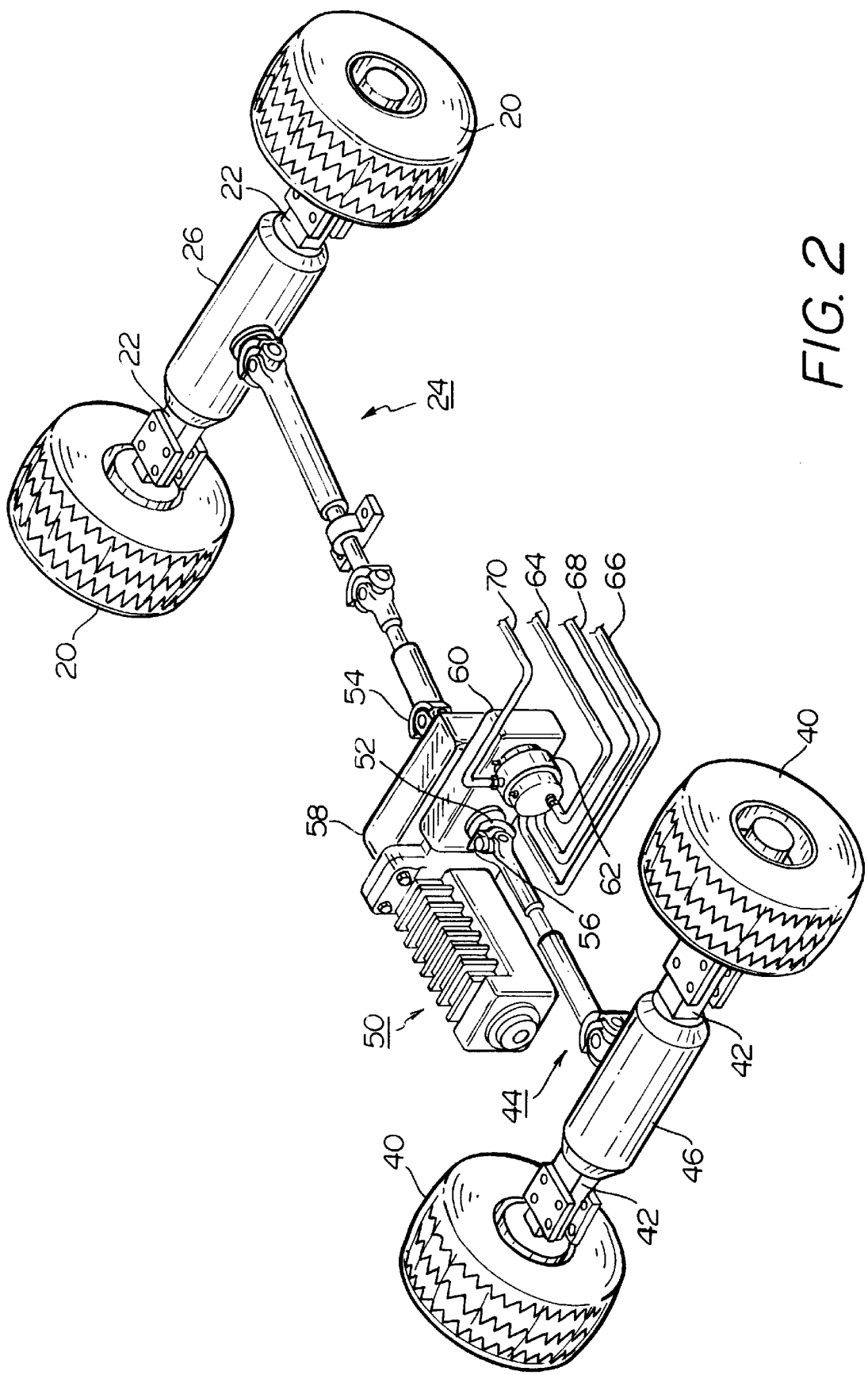
FIG. 2 is an overall perspective view of the drive train and brake components forming part of the undercarriage of the scoop car of FIG. 1.

Referring to FIGS. 1 and 2, the brake system of the present invention, generally designated 10, may be employed on an underground mining car, generally designated 12, and known in mining operations as a "scoop" car. The scoop car 12 comprises a front section 14 and a rear section 16 articulated at a pivot connection 18 to facilitate turning around bends in a mining tunnel, such as found in coal mines.

The front section 14 of the scoop car travels on a pair of front wheels 20, 20 which are rotatably mounted on front axle housings 22, 22 and are driven in rotation by corresponding axles (not shown) connected to a front drive train 24 through a front differential 26. At the front end of front car section 14 is an articulated and hydraulically powered scoop 28 having a pusher plate 30, which is reciprocated by a hydraulic piston and cylinder assembly 32 for pushing from the scoop bucket any materials received therein. Fixedly mounted on the front section 14 is an operator seat 34, a control panel 36, and a hydraulic pump and motor assembly 38 for providing hydraulic fluid under pressure to operate the hydraulic powered components of the scoop car.

The rear car section 16 is supported for translational movement by a pair of rear wheels 40, 40 rotatably mounted on rear axle housings 42, 42 and driven by axles (not shown) connected to a rear drive train 44 through a rear differential 46. Carried at the rear end of rear car section 12 are four battery compartments 48 each for housing a plurality of electric batteries (not shown) for powering an electric drive motor 50.

Both the front drive train 24 and the rear drive train 44 are driven by drive shaft segments connected to an output shaft 52 through a front universal joint 54 and a rear universal joint 56, respectively. The output shaft 52 passes through a motor reducer 58 and a brake reducer 60. The electric drive motor 50 is connected to the motor reducer 58, and a wet brake assembly 62 is connected to the brake reducer 60. As shown in FIG. 2, the wet brake assembly 62 is in fluid communication with a hydraulic system (FIG. 5) via a plurality of hydraulic lines that include a service brake line 64, a parking brake line 66, a cooling fluid inlet line 68 and a cooling fluid outlet line 70.

Figure 3:
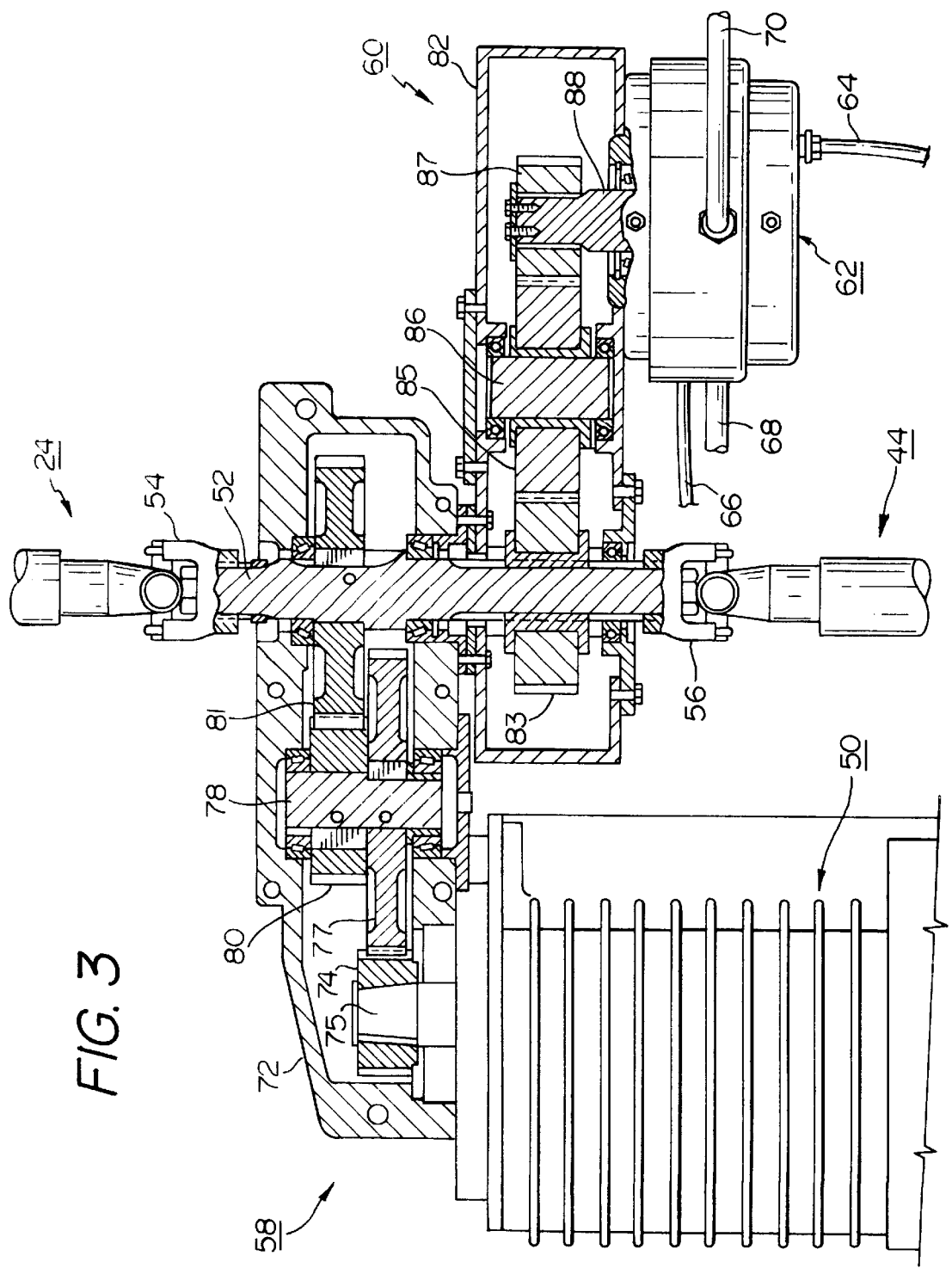
FIG. 3 is a plan view in partial section showing the gear trains of both the drive gearing reducer and the brake gearing reducer.

The internal components of the motor reducer 58 and the brake reducer 60 will now be described with reference to FIG. 3. The drive reducer 58 comprises a housing 72 containing a motor pinion 74 keyed for rotation with a motor drive shaft 75. Motor pinion 74 engages a first drive gear 77 such that pinion 74 and gear 77 provide an input gear set. Gear 77 is keyed for rotation with a drive idler shaft 78 along with a second drive gear 80, which in turn engages an output gear 81 such that drive gear 80 and output gear 81 constitute an output gear set. Gear 81 in turn drives the output shaft 52, which is drivingly connected to front drive train 24 by universal joint 54 and to rear drive train 44 by universal joint 56.

Also keyed to the output shaft 52 is a first brake gear 83 engaged by a second brake gear 85, which in turn is engaged by a brake pinion 87. Second gear 85 is keyed or fitted for rotation with a brake idler shaft 86, and brake pinion 87 is keyed for rotation with an input brake shaft 88. Gears 83 and 85 thus provide a brake gear set arranged for braking the output shaft 52 in response to a braking torque applied to the brake gear set by the brake assembly 62 through its brake shaft 88 and brake pinion 87. Each of the shafts 52, 75, 78, 86 and 88 are mounted for rotation by corresponding sets of bearings as shown in FIG. 3.

An important feature of the invention is the overall brake gear ratio provided by the gears 83 and 85 and pinion 87 relative to the overall drive gear ratio provided by the pinion 74 and gears 77, 80 and 81, the overall brake gear ratio being arranged to act in opposition to (against) the overall drive gear ratio. These gear ratios are selected so that the braking torque available at the input brake shaft 88 of brake assembly 62 substantially exceeds the driving torque applied at the brake input shaft 88 through the respective gear trains. In other words, the braking torque at brake input shaft 88 should substantially exceed, preferably by a factor of at least 1.5, more preferably by a factor of at least 2.0, and most preferably by a factor in the range of 2.5 to 3.0, the maximum driving torque that can be applied at the brake input shaft 88 by the drive motor 50 through the respective pinions and gears 74, 77, 80, 81, 83, 85 and 87.

By way of example for an electric motor capable of generating a maximum of 50 horsepower at 1200 revolutions per minute (rpm), a drive reducer gear ratio of 3.47 would apply about 760 foot pounds of torque to the output shaft 52 (motor torque of 219 foot pounds multiplied by ratio of 3.47). For this drive torque, a preferred brake reducer gear ratio is 2.67 for a wet brake assembly 62 rated at about 750 foot pounds of braking torque at input shaft 88. The drive torque reduction ratio of 2.67 provided by the brake reducer results in a drive torque of about 284 foot pounds at the brake input shaft 88 (760 foot pounds of drive torque divided by reduction ratio of 2.67). The rated braking torque of 750 foot pounds thereby exceeds the drive torque of 284 foot pounds by a factor of about 2.64 at the brake input shaft 88, which is greater than a factor of 2.0 and within the most preferred range of 2.5 to 3.0.

Figure 4:
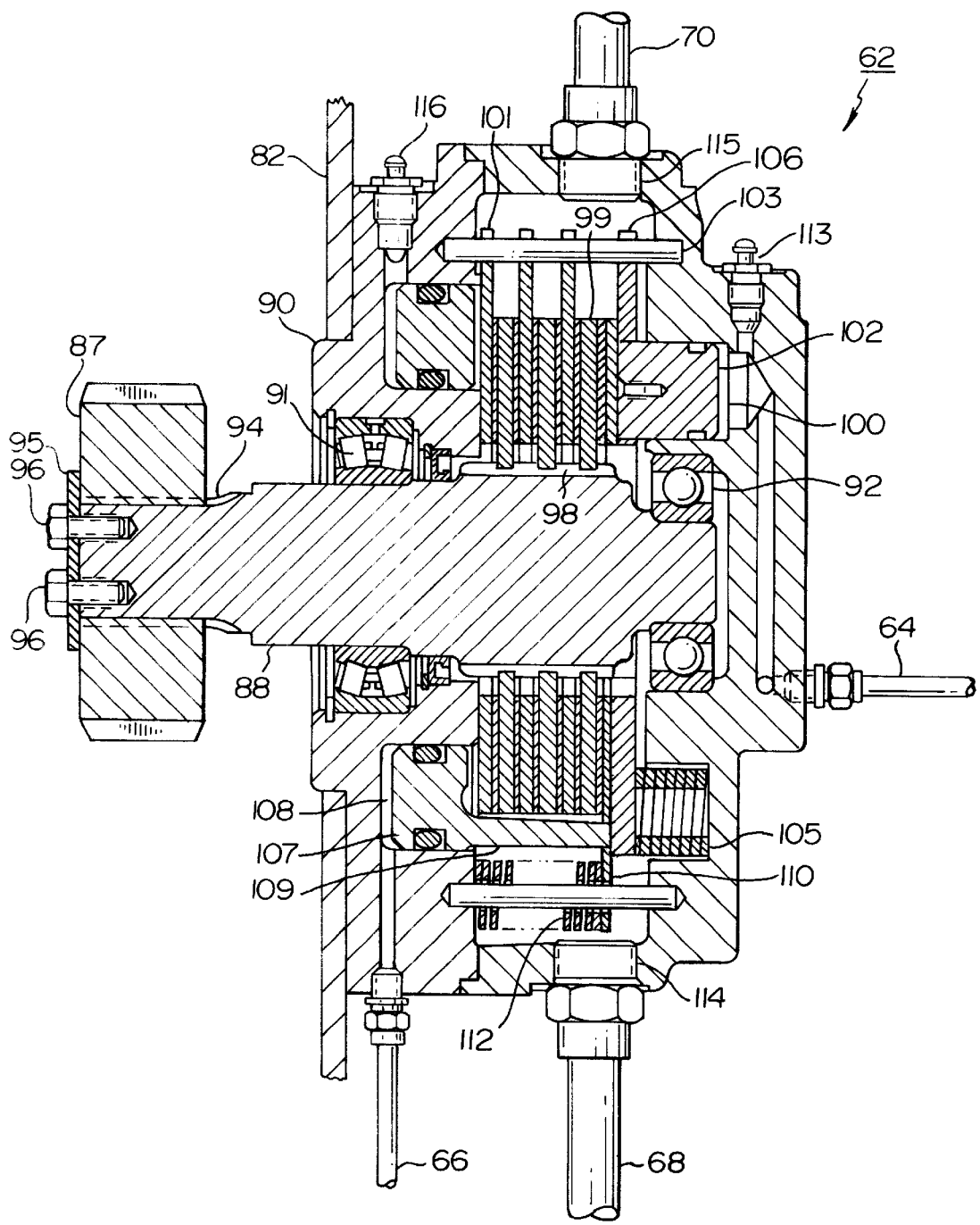
FIG. 4 is an elevational view in section showing the internal components of the brake assembly of FIGS. 1–3.

Although other types of brake assemblies may be used, the brake assembly 62 is preferably a wet brake device that will now be described with reference to FIG. 4. As shown in this figure, the brake shaft 88 is mounted for rotation in a housing 90 by a roller bearing set 91 and a ball bearing set 92. The brake pinion 87 is mounted on a splined end 94 of shaft 88 and secured thereon by a plate 95 and bolts 96,96.

Mounted on an inner splined section 98 for rotation with the shaft 88 are a plurality of rotating brake discs 99. A plurality of stationary brake discs 101 are held in place by a torque pin 103, each end of which is received in a corresponding bore within the housing 90. The torque pin 103 passes freely through corresponding apertures in the stationary discs 101 so that these discs may move laterally along the axis of pin 103 as the discs engage the rotating discs and wear with use. Rotating discs 99 are similarly free to move laterally along the axis of spline 98 as these discs engage the stationary discs and wear with use.

The wet brake 62 provides two different types of braking action. The first of these is a parking brake action provided by a plurality of brake set springs 105, which press against a pressure plate 106 held stationary against rotation by the torque pin 103. For example, there may be 15 such compression springs at equal arc spacings. Compression springs 105 keep the rotating discs 99 and the stationary discs 101 firmly engaged in the absence of a brake release pressure on the fluid in parking brake line 66. The braking action provided by springs 105 is prevented (released) when fluid in an annular cylinder 108 connected to parking brake line 66 is pressurized to a level sufficient to fully extend an annular piston 107 in an outward direction (toward the right in FIG. 4). This causes a plurality of outwardly projecting arms 109 carried by the annular piston 107 to engage the parking pressure plate 106 to fully compress the springs 105, and thereby hold the pressure plate 106 out of engagement with a service pressure plate 110 that would otherwise cause frictional engagement between the brake discs 99 and 101.

The second type of braking action is provided by fluid pressure in service brake line 64, which pressurizes a plurality of service cylinders 100 each with a service piston 102 and forces these pistons against the service pressure plate 110, thereby causing frictional engagement between the brake discs 99 and 101. Upon release of service brake pressure by reverse fluid flow through line 64, the service pistons 102 are returned to disengaged positions by a plurality (such as two) of return compression springs 112 that bear against service pressure plate 110 in opposition to service pistons 102. As also shown in FIG. 4, the service pistons 102 pass through apertures in the parking pressure plate 106 and thereby engage service pressure plate 110 on its side opposite to that engaged by the springs 112. This second type of braking action comes into play only when the parking brake has been released by the application of sufficient fluid pressure in the annular pressure cylinder 108 via line 66.

As evident from the foregoing, the parking pressure plate 106 is spring loaded to apply the brake in a fail safe mode, and hydraulic pressure in annular cylinder 108 is required to release the brake. Therefore, the cylinder 108 is normally pressurized to have the pressure plate 106 in its brake releasing position when the vehicle hydraulic system is running normally. Any occurrence that reduces the pressure in the vehicle hydraulic system below the release pressure corresponding to the spring force of springs 105, will allow these springs to apply the parking brake.

For variable energy application of the brake by a brake pedal operating a master cylinder, a variable hydraulic pressure from the master cylinder is applied via line 64 to the service pistons 102 to develop a braking torque proportional to the applied pressure. A flow of cooling fluid is supplied to the wet brake 62 by inlet line 68 connected to brake housing 90 via an inlet port 114, and is discharged from the brake housing 90 by return line 70 connected to brake housing 90 via an outlet port 115. The housing 90 also has ports for a bleed screw 113 for venting air from the interconnected service piston chambers 100, and a bleed screw 116 for venting air from parking piston chamber 108, when the wet brake is initially filled with hydraulic fluid.

Figure 5:
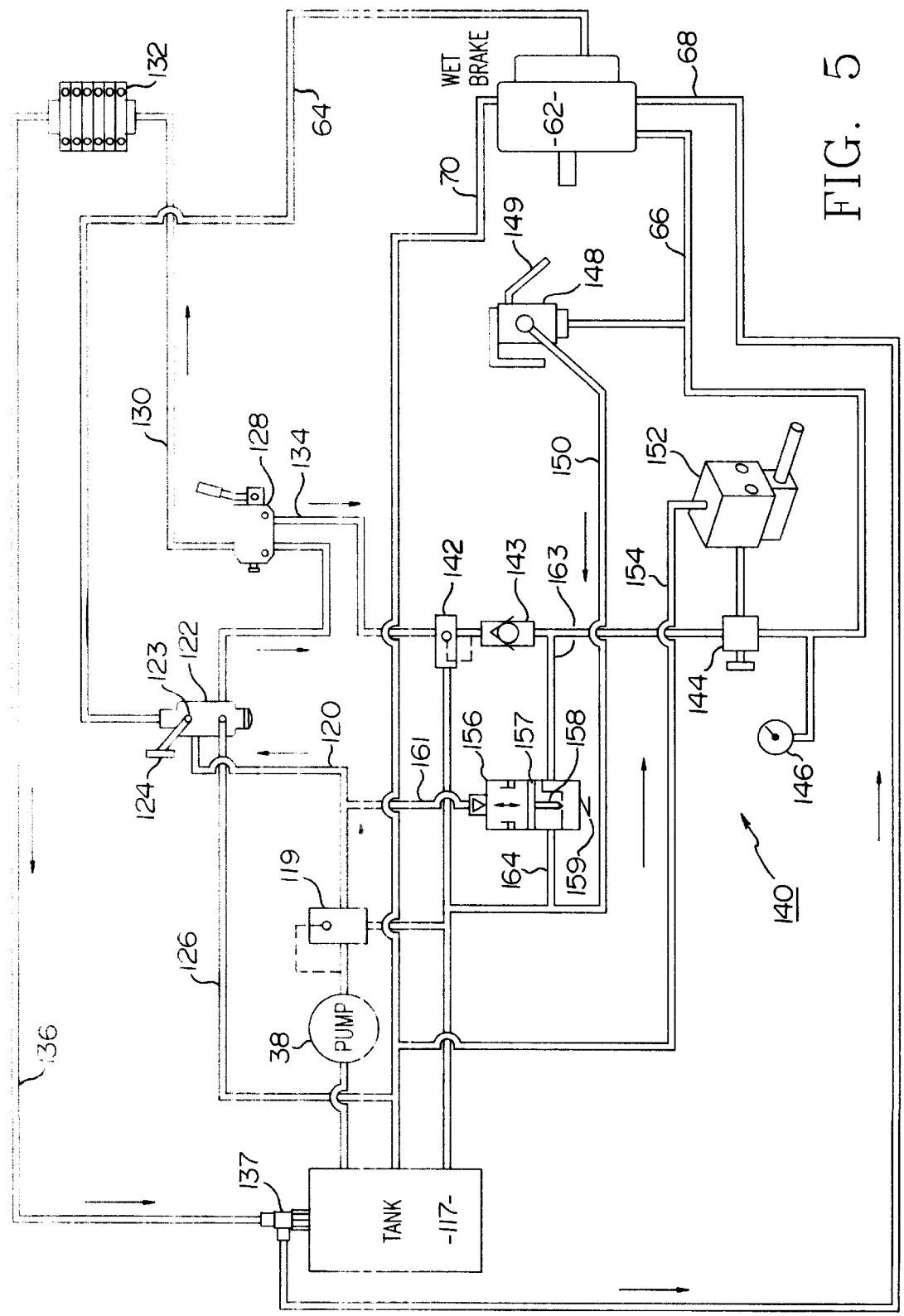
FIG. 5 is a schematic diagram of the fluid system providing hydraulic fluid to the brake assembly of FIG. 4; and, FIG. 6 is a diagrammatic view in partial section showing a conventional disc brake assembly of a prior art type that may be replaced by the brake system of the present invention.

Referring now to FIG. 5, the hydraulic system for operating and cooling the wet brake 62 is shown in diagrammatic form. A storage tank or reservoir 117 provides a supply of hydraulic fluid to the hydraulic pump 38, which is also shown in FIG. 1. The fluid discharged by pump 38 is fed through a relief valve 119 and a main supply line 120 to a master cylinder 122. In response to actuation of a valve 123 operated by a brake peddle 124, pressurized hydraulic fluid is supplied either to the wet brake 62 via service line 64, or returned to the reservoir 117 via a bypass line 126.

Pressurized hydraulic fluid from the master cylinder 122 is also supplied continuously via a brake release valve 128 and a main line 130 to a valve bank 132 for operating the main hydraulics of the scoop car. A portion of the fluid in line 130 is supplied on demand via a supply line 134 to the parking brake system, upon actuation of the brake release valve 128. Excess fluid from the car's main hydraulics is recycled continuously from the valve bank 132 to the reservoir 117 via a main return line 136. Also, a portion of the fluid continually recirculated through line 136 is diverted by a Tee 137 to provide a continuous flow of cooling fluid through the wet brake 62 via inlet line 68 and return line 70.

Referring now to the parking braking system, generally designated 140 in FIG. 5, the supply line 134 passes through a relief valve 142, a check valve 143, and a hand pump diversion valve 144, after which it joins parking line 66. Connected to parking line 66 is a pressure gauge 146 and a dump valve 148 actuatable by a panic bar 149 in case of an emergency requiring immediate parking brake engagement. The discharge from dump valve 149 is connected to the reservoir 117 via a dump line 150. A hand pump 152 is provided in an emergency supply line 154 to provide brake fluid pressure to parking line 66 via diversion valve 144 to permit releasing the brake 62 in the event of a failure of the hydraulic pump 38.

A pilot valve 156 is provided to permit reverse flow from the parking cylinder 108 and engagement of the parking brake in response to the force of springs 105 when the fluid pressure in main supply line 120 drops below a predetermined level, either when the pump 38 is turned off or in the event of a pump or hydraulic line failure. For this purpose, a diaphragm or piston 157 in the pilot valve will move upward in response to a predetermined pressure decrease in a line 161 connecting an upper chamber of the pilot valve to main supply line 120. This upward movement causes a valve element 158 to open and connect two lower valve chambers, which in turn interconnect an upstream line 163 from brake line 134 to a downstream line 164 that discharges to the dump line 150 connecting the dump valve 149 to the reservoir 117.

Figure 6:
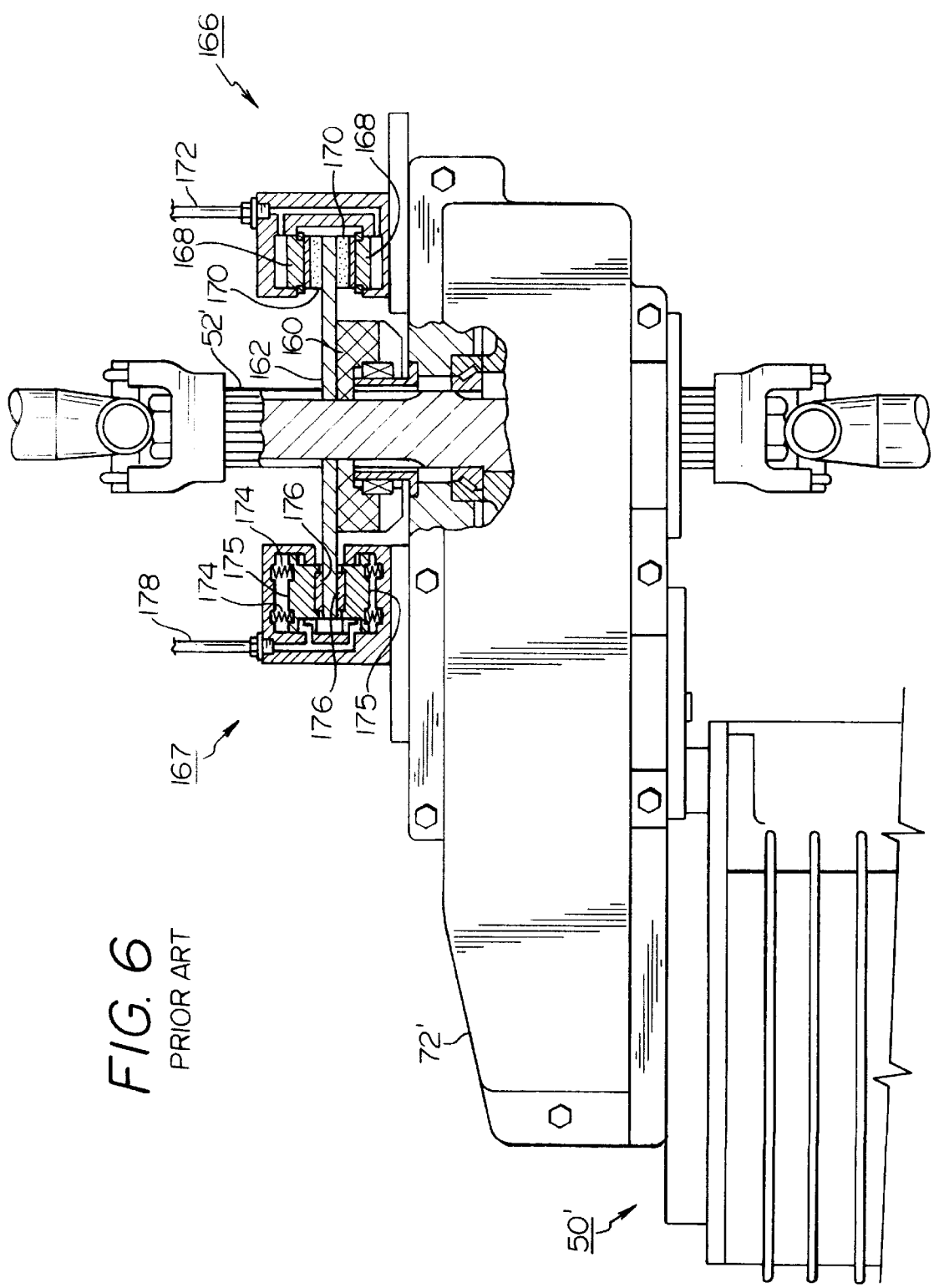

Referring now to FIG. 6, there is shown therein a prior art disc brake assembly mounted on a drive reducer housing 72' containing drive gears corresponding to those previously described with reference to FIG. 3 for transmitting the output of an electric motor 50' to a splined output shaft 52'. Mounted for rotation with shaft 52' is a disc carrier 160 attached to and supporting a brake disc 162. The brake disc 162 is engaged by the opposing brake pads of two conventional disc brake units 166 and 167, unit 166 serving as a service brake and unit 167 serving as a fail safe parking brake. In the service brake 166, a pair of hydraulic pistons 168,168 are arranged to force opposing service brake pads 170,170 against opposite surfaces of the brake disc 162 in response to fluid pressure in line 172. Such conventional service brake systems are unreliable for use on scoop cars, wear out rapidly in such applications, and can be dangerous because they lack the braking power of the present invention.

In the parking brake 167 associated with such conventional brake systems, two or more compression springs 174,174 are arranged to force parking brake pads 176,176 on opposing pistons 175,175 against opposite surfaces of the brake disc 162 in response to a loss of fluid pressure in line 178. Parking brake 167 is released when line 178 is pressurized by an amount sufficient to overcome the spring forces of the springs 174,174. Such conventional parking brake assemblies are not strong enough to hold a scoop car should the operator, as often happens, forget to disengage the parking brake prior to operating the car. Such operation without releasing the parking brake results in destruction of the brake assembly.

It follows that the new braking system of the present invention provides both better service brake power and better parking brake power, and has much greater durability than conventional brake systems. In particular, the brake system of the invention does not allow a scoop car or other electrically powered vehicle to be moved without disengaging the brake, even with operation of the electric motor at full static power. In addition, the new brake system can readily stop the vehicle, even with the motor operating at full dynamic power.

Another important feature of the present invention is that prior art brake systems, such as that shown in FIG. 6, can readily be retrofitted with the present invention. This may be accomplished by removing the prior art brake assembly 159, along with the prior art output shaft 52'. The longer output shaft 52 of FIG. 3 is then substituted for the shorter output shaft 52' and the brake reducer housing 82 is mounted on the rear side of drive reducer housing 72', with the contents and attachments of the brake reducer housing 82 arranged to engage the substitute output shaft 52 as shown in FIG. 3.

The specific embodiments described above are presented by way of example and not by way of limitation. Thus, the present invention is not limited to the described embodiments, which can undergo many different alterations that may occur to those skilled in the art upon learning of the specific embodiments described. For example, the brake system of the invention may be used on the drive trains of a wide variety of electrically powered vehicles, in addition to scoop cars and other types of underground mining vehicles. Furthermore, the brake assembly 62 may employ other wet brake designs, or conventional dry brake designs such as illustrated in FIG. 6. Thus, the scope of the present invention is to be defined only by the claims set forth below.

What is claimed is:

1. A brake system for braking an output shaft rotated by a drive gear train driven by an electric motor capable of generating a maximum drive torque at the output shaft, said output shaft being connected to a plurality of axles each for driving a corresponding wheel of a vehicle having a fluid system for providing a fluid under pressure to operate fluid powered components of the vehicle, said brake system comprising:

a brake device comprising a rotatably mounted brake shaft and brake elements capable of applying a maximum braking torque to said brake shaft; and a reduction gear train for transmitting torque between said output shaft and said brake shaft, said reduction gear train comprising a brake gear fixed to said brake shaft for rotation therewith, and an output gear fixed to said output shaft for rotation therewith;

wherein said reduction gear train provides a reduction gear ratio sufficient to reduce said maximum drive torque to a drive torque at said brake shaft substantially less than said maximum braking torque;

wherein said brake elements comprise at least one stationary disc held against rotation relative to a housing, at least one rotating disc mounted on said brake shaft for rotation therewith, and at least one compression element for pressing together said stationary disc and said rotating disc to provide a braking torque;

wherein said stationary and rotating discs are enclosed in a housing having a cooling inlet and a cooling outlet;

wherein said fluid system comprises a pump for pressurizing said fluid and a container for containing a supply of said fluid, said pump and said container being remote from said housing;

and wherein said fluid system further comprises a conduit for supplying a cooling flow of said fluid from said pump to said cooling inlet and a conduit for returning a flow of said cooling fluid from said cooling outlet to said container.

2. A brake system according to claim 1, wherein said reduction gear ratio is such that the drive torque at said brake shaft is less than said maximum braking torque by a factor of at least 1.5.

3. A brake system according to claim 2, wherein said factor is at least 2.0.

4. A brake system according to claim 3, wherein said factor is in the range of 2.5–3.0.

5. A brake system according to claim 1, wherein said brake elements comprise a plurality of said stationary discs held against rotation relative to said housing, and a plurality of rotating discs mounted on said brake shaft for rotation therewith.

6. A brake system according to claim 1, wherein said compression element comprises a resilient spring for pressing said discs together with a parking brake force, and wherein said brake system further comprises at least one fluid piston arranged to prevent said parking brake force until a fluid pressure applied to said piston decreases below a predetermined level.

7. A brake system according to claim 1, wherein said compression element comprises a service piston, and said brake system further comprises a service fluid system arranged to apply fluid pressure for causing said service piston to press said discs together with a service brake force which is variable in response to changes in said fluid pressure caused by a manually operable brake member.

8. A brake system according to claim 7, wherein said brake elements further comprise another compression element comprising a resilient spring for pressing said discs together with a parking brake force, and wherein said brake system further comprises at least one parking piston arranged to prevent said parking brake force until a fluid pressure applied to said parking piston decreases below a predetermined level.

9. A brake system according to claim 1, wherein said reduction gear train further comprises at least one intermediate gear rotatably mounted on an idler shaft for transmitting torque between said output gear and said brake gear.

10. A method of providing a brake system for braking a drive train having an existing output shaft rotated by a drive gear train driven by an electric motor capable of generating a maximum drive torque at the output shaft, said output shaft being connected to a plurality of axles each for driving a corresponding wheel of a vehicle having a fluid system for providing a fluid under pressure to operate fluid powered components of the vehicle, said method comprising:

assembling a brake device comprising a rotatably mounted brake shaft and brake elements capable of applying a maximum braking torque to said brake shaft;

substituting a modified output shaft for said existing output shaft; and, assembling a reduction gear train comprising a brake gear fixed to said brake shaft for rotation therewith, and output gear fixed to said modified output shaft for rotation therwith, said reduction gear train being arranged to transmit torque between said modified output shaft and said brake shaft, and said reduction gear train being selected to provide a reduction gear ratio sufficient to reduction said maximum drive torque to a drive torque at said brake shaft substantially less than said maximum braking torque;

wherein said brake elements comprise at least one stationary disc held against rotation relative to a housing, at least one rotating disc mounted on said brake shaft for rotation therewith, and at least one compression element for pressing together said stationary disc and said rotating disc to provide a braking torque;

wherein said method further comprises enclosing said stationary and rotating discs in a housing having a cooling inlet and a cooling outlet and assembling a fluid system;

wherein said fluid system comprises a pump for pressurizing said fluid and a container for containing a supply of said fluid, said pump and said container being remote from said housing, and wherein said fluid system further comprises a conduit for supplying a cooling flow of said fluid said pump to said cooling inlet, a conduit for returning a flow of said cooling fluid from said cooling outlet to said container.

11. A method according to claim 10, wherein said reduction gear ratio is such that the drive torque at said brake shaft is less than said maximum braking torque by a factor of at least 1.5.

12. A method according to claim 11, wherein said factor is at least 2.0.

13. A method according to claim 12, wherein said factor is in the range of 2.5–3.0.

14. A method according to claim 10, wherein said brake elements comprise a resilient spring for pressing said discs together with a parking brake force, at least one parking piston arranged to prevent said parking brake force until a fluid pressure applied to said parking piston decreases below a predetermined level, a service piston, and a service fluid system arranged to apply fluid pressure for causing said service piston to press said discs together with a service brake force which is variable in response to changes in said fluid pressure caused by a manually operable brake member.

15. A method according to claim 10, wherein said reduction gear train further comprises at least one intermediate gear rotatably mounted on an idler shaft for transmitting torque between said output gear and said brake gear.

* * * * *